United States Patent

[11] 3,589,134

| [72] | Inventors | Robert L. Hackmann<br>Glen Burnie;<br>Donald W. Hunt, Baltimore, both of, Md. |
|------|-----------|----|
| [21] | Appl. No. | 872,704 |
| [22] | Filed | Oct. 30, 1969 |
| [45] | Patented | June 29, 1971 |
| [73] | Assignee | Westinghouse Electric Corporation<br>Pittsburgh, Pa. |

[54] MANIPULATOR APPARATUS
7 Claims, 5 Drawing Figs.

[52] U.S. Cl. .................................................. 61/96 R,
214/1 CM, 294/66
[51] Int. Cl. .............................................. B25j 1/02
[50] Field of Search .......................................... 294/66, 86
A, 86 H; 214/1 RCM, 1 RC, 1 BD, 762, 764, 1 BC,
147 T; 61/69

[56] References Cited
UNITED STATES PATENTS

| 2,861,699 | 11/1958 | Youmans | 214/1 BD |
| 3,414,136 | 12/1968 | Moore et al. | 214/1 CM |
| 3,422,965 | 1/1969 | Lloyd | 214/1 CM |

Primary Examiner—Joseph Wegbreit
Assistant Examiner—Bruce H. Stoner, Jr.
Attorneys—F. H. Henson, E. P. Klipfel and D. Schron ABSTRACT: A manipulator arm assembly having three arm sections and shoulder, elbow and wrist pivotal joints. The third arm section carries a tool or the like. The rate of rotation of the shoulder pivotal joint is commanded by an operator and signal processing equipment commands the other two pivotal joints such that the tool travels in a straight line.

MANIPULATOR APPARATUS

BACKGROUND OF THE INVENTION

1. Field of the Invention

Manipulator arm assemblies and controls therefor.

2. Description of the Prior Art

Mechanical arms, sometimes referred to as manipulators, are very often used when a particular environment is too hostile or dangerous for a man's direct participation. The manipulators provide an extension of the human arm capability in addition to motions and capabilities not performable by a human.

A typical manipulator includes two or three pivotal arm sections the last of which carries a tool, cleaning brush, or some other terminal device such as a gripping mechanism, for performing a certain task. The terminal device is visually observed by an operator by means of direct observation or by a television system. In moving the terminal device to a desired location the operator uses a model of the manipulator served to the actual manipulator, or a puppet arrangement where control cables attached to the operator's arm move the manipulator in a corresponding manner to the arm; these types of controls can be very fatiguing to the operator and in addition where response times are relatively slow the operator must make a move and then wait to see the response of the manipulator assembly and thereafter take any necessary corrective action. This move and wait technique greatly extends the time required to perform a given task. In a manipulator having three pivots and three arm sections if it is desired to move the terminal device along a line it is necessary for the operator to command at least three different pivot actuators. An under or over command requires corrective action of one or more pivots and the relatively simple task of moving in a straight line becomes an extremely complicated procedure.

It is therefore a primary object of the present invention to provide a control system for a manipulator apparatus which relieves the operator of cumbersome and detailed manual control for various desired line movements.

SUMMARY OF THE INVENTION

A control system for manipulator assembly is provided which includes a plurality of actuators which in response to an input signal pivotally move the arm sections of the manipulator relative to one another. One of the actuators is commanded to move one of the arm sections and a positional orientation of the commanded arm section is sensed and the remaining actuators are provided with input signals to command them as a function of the positional orientation of the first arm section.

DESCRIPTION OF THE PREFERRED EMBODIMENT

Figure 1:
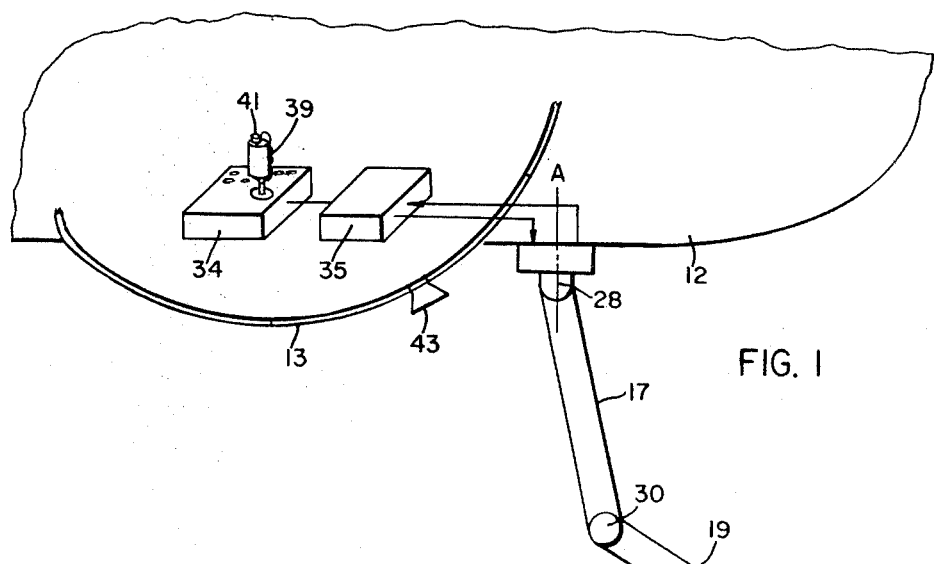
FIG. 1 is a view of a manipulator and control system utilized in conjunction with an undersea vehicle.

Referring now to FIG. 1, there is illustrated a manipulator assembly 10 mounted on an undersea vehicle 12, partially shown, and which includes a pressure hull or sphere 13 for one or more operators and observers.

The manipulator assembly 10 includes an upper arm section 17, a lower arm section 19 and a terminal arm section 21 which carries at its end a terminal device 22 such device being illustrated as including a cleaning brush 24 on one side thereof and a gripping mechanism 25 on the other side thereof.

Included in the means for controlling the assembly is a plurality of actuators 28, 30 and 32 for effecting relative pivotal movement between the arm sections.

An analogy may be made to the human arm and accordingly actuator 28 may also be thought of as a shoulder actuator, actuator 30 as an elbow actuator and actuator 32 as a wrist actuator. Although various types of actuators may be incorporated, a typical actuator for such use is the servo-controlled hydraulic actuator. The actuators 28, 30 and 32 allow pivotal movement about a horizontal axis so that in effect, the terminal device 22 moves in the plane of the drawing. Not shown are additional actuators for allowing the entire assembly to rotate around a vertical axis A and for allowing a portion of the terminal arm 21 to rotate about a vertical axis B. Additionally, the terminal device 22 is rotatably about a horizontal axis C to interchange the positions of the brush 24 and gripping mechanism 25.

Positioned within the pressure sphere 13 is a control input unit 34 and a signal processing unit 35 communicative with the actuators 28, 30 and 32 and with various position sensors, as will be described. The control input unit includes a joy stick 39 which is movable along mutually perpendicular axes and is additionally rotatable for controlling, in conjunction with a mode selection thumb switch 41, manipulator movements.

Observation of the terminal device 22 may be made remotely by television means or may be made visually directly through a view port 43.

Figure 2A:
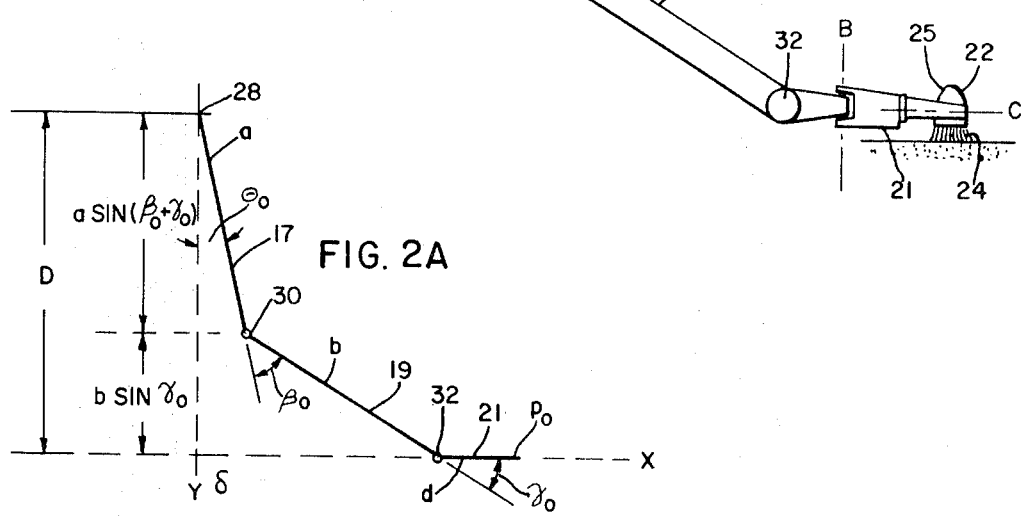
FIGS. 2A and 2B are line representations of a manipulator arm defining various lengths and angles in two orientations of the manipulator arm.
Figure 2B:
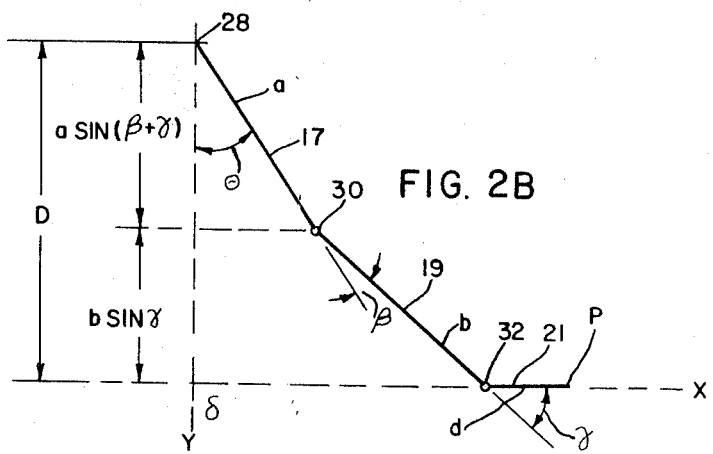

The present invention will be described with respect to movement of the terminal device along a straight line and FIGS. 2A and 2B are simplified line diagrams of the assembly to illustrate and define various angular and linear relationships. It will be apparent that if concurrently with the straight line movement the assembly is commanded to rotate about vertical axis A, the terminal device will travel in a curved line.

The arm sections are shown as lines having the same reference numerals as the corresponding arm sections in FIG. 1, and the actuators for effecting relative pivotal movement between the arm sections are shown as points having the same reference numerals as the actuators of FIG. 1. The length of upper arm section 17 is $a$, the length of lower arm section 19 is $b$, and the length of terminal arm section 21 is $d$. Actuator 28 is located on the X-axis and the desired operation is that terminal arm section 21 travel in a straight line along the X-axis. FIG. 2A may be considered as a reference, or initial position and in such initial position upper arm section 17 is at an angle $\theta_o$ with respect to the Y-axis, lower arm section 19 is at an angle $\beta_o$ with respect to the upper arm sections 17, terminal arm section 21 is at an angle of $\alpha_o$ with respect to lower arm section 19, and the angle between the X- and Y-axes is $\delta$.

The distance from the X-axis to 28 is D and the terminal end of arm section 21 is positioned at coordinate point $P_o$. The required operation is that the terminal end move to some distant coordinate point P (FIG. 2B), lying on the X-axis and accordingly the vertical distance between point P and 28 is unchanged from FIG. 2A. That is, the vertical distance between any point on the X-axis and 28 is D.

In FIG. 2A, $\theta_o + \beta_o + \alpha_o = \delta$ and in FIG. 2B, $\theta + \beta + \alpha = \delta$. Therefore $\theta_o + \beta_o + \alpha_o = \theta + \beta + \alpha$. From the above relationships:

$$\theta_o + \beta_o + \alpha_o - \theta - \beta - \alpha = 0. \quad (1)$$

The projection of upper arm 17 onto the Y-axis forms one component of the distance D and the projection of the lower arm section 19 onto the Y-axis forms the remaining portion of distance D. The respective distances are $a \sin(\beta_o + \alpha_o)$ and $b \sin \alpha_o$, and therefore $a \sin(\beta_o + \alpha_o) + b \sin \alpha_o = D$. Similarly, from FIG. 2B, $a \sin(\beta + \alpha) + b \sin \alpha = D$ and therefore $a \sin(\beta_o + \alpha_o) + b \sin \alpha_o = a \sin(\beta + \alpha) + b \sin \alpha$. From the above relationships:

$$a \sin(\beta + \alpha) + b \sin \alpha - a \sin(\beta_o + \alpha_o) - b \sin \alpha_o = 0 \quad (2)$$

Figure 3:
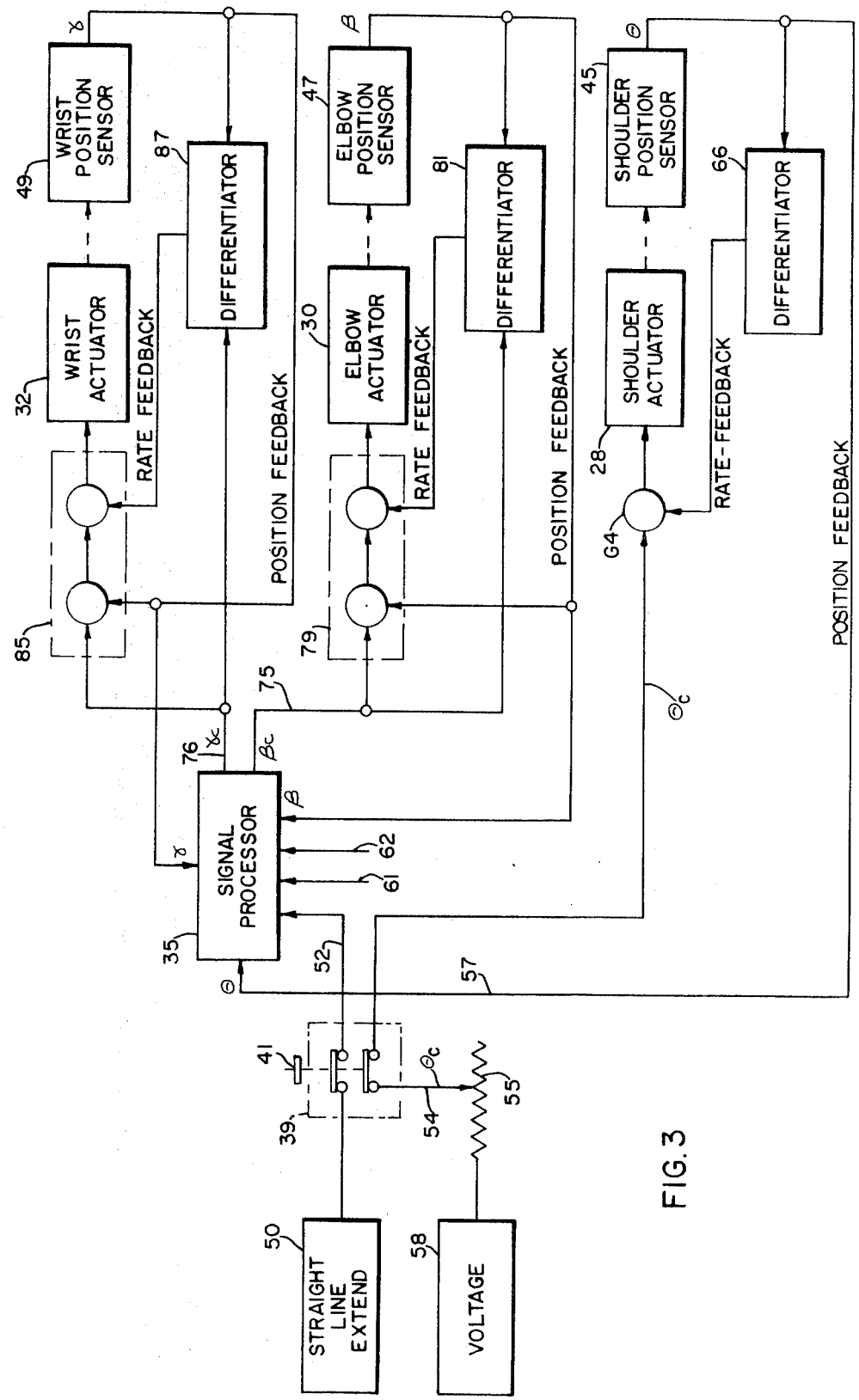
FIG. 3 is a block diagram of a preferred embodiment of the present invention.

As long as the equalities of equations (1) and (2) are maintained the terminal end of arm 21 travels in the desired straight line along the X-axis. FIG. 3 is a block diagram of apparatus for performing the desired movement.

For the arm sections there is included a plurality of position sensors to provide respective position signals for the arm sections indicative of their angular orientation. A shoulder sensor 45 provides an output signal $\theta$, an elbow sensor 47 provides an output signal $\beta$ and a wrist sensor 49 provides an output signal $\alpha$, the signals $\theta$, $\beta$ and $\alpha$ being equivalent to the angles $\theta$, $\beta$ and $\alpha$ previously described.

In the present invention movement of the terminal device along a straight line is effected with a single command, commanding a selected one of the actuators. The positional orientation of the commanded section, in conjunction, with the positional orientation of the remaining arm sections is utilized by the signal processor 35 for commanding the remaining actuators to move their associated arm sections.

The manipulator apparatus may have several modes of operation of which movement of the terminal device along a straight line is one of them. The particular mode of operation is determined by the setting of the thumb switch 41 of FIG. 1 and a portion of this thumb switch as well as the joy stick 39 are diagrammatically illustrated in FIG. 3.

The thumb switch 41 when depressed to the position illustrated serves as a means for connecting a straight line extend signal, or command, from source 50 to the signal processor 35 by way of line 52. By way of example, the source 50 may be a DC voltage. When the straight line extend signal is provided, the output signals from the position sensors are stored as initial conditions in the signal processor. These initial $\theta$, $\beta$, and $\alpha$ positions stored are the respective $\theta_o$, $\beta_o$ and $\alpha_o$ terms of equation (1).

The shoulder actuator 28 is commanded by an input signal $\theta_c$. Preferably this signal is derived from a fore-aft movement of the joy stick 39. By way of example, with the thumb switch 41 in the position illustrated, for a straight line extend mode of operation, a wiper arm 54 picks off the voltage at a particular point on resistance means 55 and applies it to the shoulder mechanics by way of line 57. The voltage source 58 may provide a D.C. voltage and movement of the joy stick 39 causes the wiper arm 54 to sense various voltages in accordance with, and related to, joy stick movement.

Prior to switch activation for a straight line extension the actuators may be commanded by other apparatus, not illustrated, by signals on lines 57, 61 and 62. The signal on line 57 appearing at the summer 64 is the desired or reference signal input. The output signal $\theta$ of sensor 45 is an indication of the actual position which is supplied to signal processor 35 and also to differentiator 66, the output of which is applied to the summer 64 and is an actual rate signal which is compared with the reference signal to obtain an error signal for driving the shoulder actuator 28. In response to the position signal $\theta$ from position sensor 45, signal processor 35 is operative to provide an output signal $\beta_c$ on line 75 to command the elbow actuator 30 and a signal $\alpha_c$ on line 76 to command the wrist actuator 32 whereby the equalities of equations (1) and (2) are maintained.

Each of the elbow and wrist mechanisms has a servo feedback loop for governing response of the arm sections. The output $\beta$ of the elbow position sensor 47 is provided to three different circuits, one being the signal processor 35, another being the summer 79 and the third being the differentiator 81, the output rate signal of which is also provided to summer 79 which generates an error signal to drive the elbow actuator 30. The differentiator 81 additionally receives the commanded $\beta_c$ signal from the signal processor 35 and differentiates the difference between the commanded and actual $\beta$ signals. Such servo loops per se are known to those skilled in the art.

In a similar manner, with respect to the wrist mechanism, the output position signal $\alpha$ of the wrist position sensor 49 is provided to the signal processor 35, a summer 85 and a differentiator 87 which additionally receives the commanded $\alpha_c$ signal, and whose differentiated or rate output signal is provided to summer 85 for generating an error signal to drive the wrist actuator 32.

Figure 4:
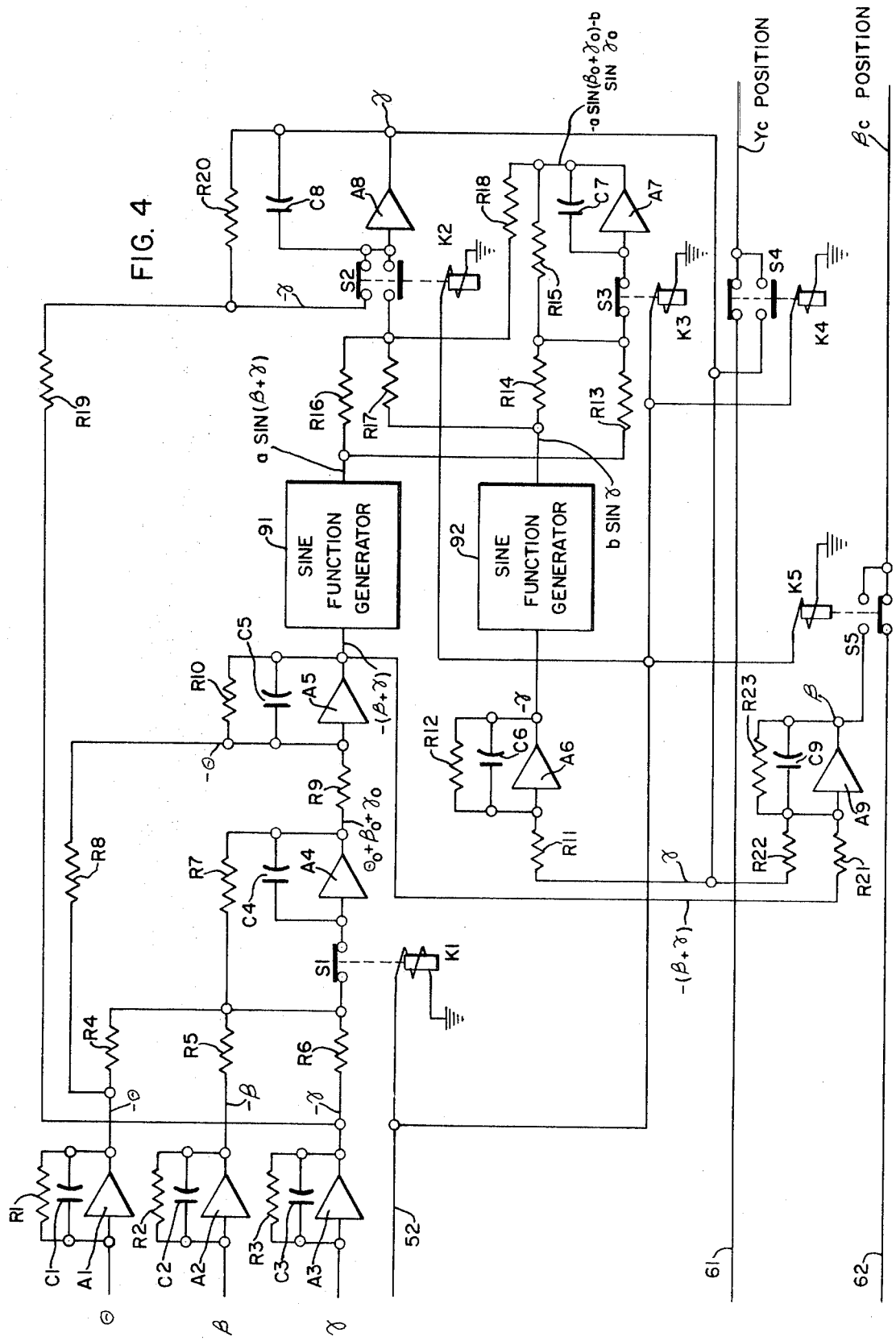
FIG. 4 illustrates the signal processor of FIG. 3 in more detail.

Operation and control of the system is governed by the signal processor 35, a more detailed view of which is illustrated in FIG. 4. The function of the signal processor 35 is to receive the actual position signals and, when commanded, to store them and thereafter generate proper signals to drive two of the actuators as a function of the position of the single driven mechanism such that the terminal end of the terminal arm section moves in a straight line. To perform this function, various types of signal processors may be provided and the circuit of FIG. 4, being analog in nature, is exemplary.

The signal processor 35 includes a plurality of operational amplifiers designated A1 to A9 and each including a respective feedback capacitor, C1 to C9 of which capacitors C4, C7 and C8 are utilized for the storage of certain values. A plurality of scaling resistors are provided and are designated R1 to R23.

Relays K1 to K5 respectively control switches S1 to S5 and in the absence of a straight line extend command on line 52 to the relays, switches S1 to S5 remain in the position illustrated.

The position sensors 45, 47 and 49 of FIG. 3 provide respective output position signals $\theta$, $\beta$ and $\alpha$ to respective operational amplifiers A1, A2 and A3 each having unity gain so that the output of A1 is $-\theta$, the output of A2 $-\beta$, and the output of A3, $-\alpha$. These three signals are applied through S1 to the input of A4 the output of which is the positive summation of the three position signals $\theta$, $\beta$ and $\alpha$. The negative $\theta$ signal from A1 is additionally applied through resistor R8, such that the input to A5 is $\theta+\beta+\alpha-\theta$. The $\theta$ term is cancelled and the output $-(\beta+\alpha)$ of A5 is applied to sine function generator 91.

The $-\alpha$ output of A3 is applied through resistor R19 and switch S2 to amplifier A8 which inverts the input signal to provide an output signal of $\alpha$. The $\alpha$ signal is inverted by amplifier A6 and applied to sine function generator 92. By proper choice of resistors R13 to R18, the $-(\beta+\alpha)$ output of amplifier A5 and $-\alpha$ output of amplifier A6 are operated upon resulting in signals $a \sin (\beta+\alpha)$ and $b \sin \alpha$. These signals are applied through switch S3 to amplifier A7 which provides as an output signal, the negative of the input signal.

Amplifier A9 receives two input signals, $-(\beta+\alpha)$ from amplifier A5, and $\alpha$ from amplifier A8. The $\alpha$ term is subtracted and the $-\beta$ term is inverted such that the output of amplifier A9 is $\beta$. With the switches S4 and S5 in the position shown, the values $\alpha$ and $\beta$ are not provided as commanded signals $\alpha_c$ and $\beta_c$; these commanded signals are received on lines 61 and 62 and are provided by other input means.

When the operator has moved the manipulator apparatus to a first coordinate point from which it is desired to move in a straight line, the thumb switch (41 in FIG. 3) is depressed and a straight line extend command on line 52 is provided to all the relays K1 to K5 which then pull their respective switch contact arms to their opposite contact. When provided with this command, the signal processor 35 stores the position signals which are provided at this first coordinate point. Upon activation of relay K1 and the opening of Switch S1, storage capacitor C4 stores the output of amplifier A4 which is $\theta+\beta+\alpha$ and since these values are indicative of the first coordinate point the signals are now designated $\theta_o+\beta_o+\alpha_o$, which is the first three terms of equation (1). When relay K3 is energized to open switch S3, storage capacitor C7 at the output of amplifier A7 stores the quantity $-a \sin (\beta_o+\alpha_o)-b \sin \alpha_o$, which is the last two terms of equation (2). Activation of relay K2 causes the contact arm of switch S2 to move to its other position and storage capacitor C8 stores the last output of amplifier A8, which output was $\alpha$.

Referring to equation (1), if $\theta$ is subtracted from $\theta_o+\beta_o+\alpha_o$ the result is $\beta+\alpha$. This operation is performed at the input of amplifier A5 which receives the continually varying signal $-\theta$ to provide an updated $-(\beta+\alpha)$ output. With switch S2 activated to its other position, the input to amplifier A8 consists of three signals, $a \sin (\beta+\alpha)$, $b \sin \alpha$, and $-a \sin (\beta_o+\alpha_o)-b \sin \beta_o$. If equation (2, is satisfied these signals should add up to zero and a zero input to amplifier A8 would maintain its output at the same value that it was when relay K2 was activated. However since $\theta$ is changing, the output of amplifier A5 changes thereby changing the term $a \sin (\beta+\alpha)$, and the input to amplifier A8 is no longer zero, resulting in a consequent change in its output $\alpha$. The $\alpha$ output is applied through switch S4 in its other position to the wrist actuator 32 (FIG. 3) as a $\alpha_c$ signal. The $\beta_c$ signal to the elbow actuator 30 is provided by amplifier A9 through switch S5 in its other position. The changing of the $\alpha$ signal from amplifier A8 results in a varying output from amplifier A6 which varies the $b \sin \alpha$ term applied to amplifier A8.

For example if $\alpha$ changes, the changing signal applied to amplifier A6 results in a changing $\alpha$ output signal at A6. The changing value of $\alpha$ changes the value of the $b \sin \alpha$ signal at the input of amplifier A8 offsetting the changing a $\sin(\beta+\alpha)$ signal, tending to maintain the summation of signals of the input of amplifier A8 equal to zero thereby satisfying the equality of equation (2). As long as the equality is maintained the terminal device will travel in a straight line when the independent input $\theta$ is varied.

The signal processor 35 of FIG. 4 is effectively operative to solve a set of two simultaneous equations, equation (1), and equation (2), containing two unknowns $\beta$ and $\alpha$. The shoulder actuator is being commanded so that the $\theta$ term is known, and one of the other two actuators is arbitrarily chosen to be moved, that is, the wrist actuator receiving the $\alpha_c$ signal. The remaining actuator signal $\beta_c$ is derived from a subtraction at the input of amplifier A9.

Although the present invention has been described with a certain degree of particularity, it should be understood that the present disclosure has been made by way of example and that modifications and variations of the present invention are made possible in light of the above teachings.

We claim as our invention:

1. A control system for a manipulator assembly having a plurality of jointed arm sections, a last of which carries a terminal device, comprising:
   a. a plurality of actuators for effecting relative pivotal movement between said arm sections;
   b. a plurality of position sensors for providing respective position signals for said arm sections indicative of the angular orientation of said arm sections;
   c. means for initially positioning said terminal device at a first coordinate point,
   d. signal processing means responsive to an input command for storing those position signals provided at said first coordinate point;
   e. signal providing means for commanding movement of one of said actuators to move a first of said arm sections;
   f. said signal processing means being responsive to
      i. said stored position signals, and
      ii. the position signal indicative of the angular orientation of said first of said arm sections as it is moved, for providing respective output signals to command the remaining actuators in accordance with a predetermined relationship, for moving said terminal device to a second coordinate point.

2. A control system according to claim 1 wherein:
   a. said signal processing means provides output signals having a relationship to move said terminal device in a straight line between said first and second coordinate points.

3. A control system according to claim 1 wherein:
   a. said manipulator assembly is carried by an undersea vehicle having a pressure hull; and
   b. said signal providing means is positioned within said pressure hull for activation by an operator.

4. A control system according to claim 3 wherein:
   a. said signal processing means is positioned within said pressure hull.

5. A control system as claimed in claim 1 wherein said signal providing means includes:
   a. a joy stick, and
   b. means responsive to movement of said joy stick for providing a related voltage, said related voltage being provided to said one of said actuators.

6. A control system as claimed in claim 5 which includes
   a. switch means carried by said joy stick,
   b. a signal source; and
   c. means including said switch means for connecting said signal source with said signal processor upon activation of said switch means; and
   d. said connection effecting a storage of said position signals.

7. A control system for a manipulator assembly having a plurality of jointed arm sections, a last of which carries a terminal device, comprising:
   a. a plurality of actuators each responsive to an input signal for effecting relative pivotal movement between said arm sections;
   b. means for commanding one of said actuators to move a first of said arm sections,
   c. means responsive to the positional orientation of said commanded arm section for providing output signals to the remaining actuators for moving the remaining arm sections as a function of said positional orientation.